US012553002B2

United States Patent
Yao et al.

(10) Patent No.: US 12,553,002 B2
(45) Date of Patent: Feb. 17, 2026

(54) PROCESS TO CONVERT LIGHT ALKANES TO DIESEL

(71) Applicants: Phillips 66 Company, Houston, TX (US); SINOPEC Shanghai Research Institute of Petrochemical Technology Co., Ltd., Shanghai (CN)

(72) Inventors: Jianhua Yao, Bartlesville, OK (US); Kening Gong, Cypress, TX (US); Huanxin Gao, Shanghai (CN); Jiangang Lyu, Shanghai (CN); Feng Xu, Shanghai (CN); Wennian Wang, Shanghai (CN); Ming Xu, Shanghai (CN); Yilun Wei, Shanghai (CN)

(73) Assignee: Phillips 66 Company, Houston, TX (US)

( * ) Notice: Subject to any disclaimer, the term of this patent is extended or adjusted under 35 U.S.C. 154(b) by 165 days.

(21) Appl. No.: 18/599,900

(22) Filed: Mar. 8, 2024

(65) Prior Publication Data

US 2024/0301308 A1 Sep. 12, 2024

Related U.S. Application Data

(60) Provisional application No. 63/489,116, filed on Mar. 8, 2023.

(51) Int. Cl.
*C10L 1/08* (2006.01)
*B01J 27/18* (2006.01)
(Continued)

(52) U.S. Cl.
CPC ............. *C10L 1/08* (2013.01); *B01J 27/1811* (2013.01); *B01J 27/1817* (2013.01);
(Continued)

(58) Field of Classification Search
CPC ............... C10L 1/08; C10L 2200/0446; C10L 2290/12; B01J 27/1811; B01J 27/1817;
(Continued)

(56) References Cited

U.S. PATENT DOCUMENTS 4,645,585 A 2/1987 White
2017/0058214 A1 3/2017 Oprins et al.

FOREIGN PATENT DOCUMENTS

CN 101172250 A 5/2008
CN 105439802 A 3/2016
(Continued)

OTHER PUBLICATIONS

International Search Report and Written Opinion from Int'l Pat. App. PCT/IB2024/052275, Jul. 4, 2024 (9 pp.).

*Primary Examiner* — Taiwo Oladapo
(74) *Attorney, Agent, or Firm* — Phillips 66 Company

(57) ABSTRACT

Various embodiments of a process for converting light alkanes to diesel are disclosed. In general, the process includes reacting a feed rich in one or more light alkanes with an aromatization catalyst to convert the light alkanes to aromatic hydrocarbons, reacting the aromatic hydrocarbons with a hydroalkylation catalyst to convert the aromatic hydrocarbons into diesel range hydrocarbons, and hydrogenating the diesel range hydrocarbons to produce a diesel product.

20 Claims, 3 Drawing Sheets

(51) Int. Cl.
*B01J 29/068* (2006.01)
*B01J 29/072* (2006.01)
*B01J 29/40* (2006.01)
*B01J 29/46* (2006.01)
*B01J 29/48* (2006.01)

(52) U.S. Cl.
CPC ........... *B01J 29/068* (2013.01); *B01J 29/072* (2013.01); *B01J 29/405* (2013.01); *B01J 29/46* (2013.01); *B01J 29/48* (2013.01); *C10L 2200/0446* (2013.01); *C10L 2290/12* (2013.01)

(58) Field of Classification Search
CPC ...... B01J 29/068; B01J 29/072; B01J 29/405; B01J 29/46; B01J 29/48; C07C 2/76; C07C 5/10; C10G 45/44; C10G 65/043; C10G 65/08; C10G 67/02; C10G 45/58; C10G 2400/02; C10G 2400/06; C10G 45/68; C10G 45/72; C10G 2300/1081; C10G 2400/04; C10G 2400/30
See application file for complete search history.

(56) References Cited

FOREIGN PATENT DOCUMENTS

| | | | |
|---|---|---|---|
| CN | 106518601 A | 3/2017 | |
| CN | 106518602 A | 3/2017 | |
| CN | 110437869 A | 11/2019 | |
| CN | 112642466 A | 4/2021 | |
| CN | 112646598 A | 4/2021 | |
| EA | 039642 B1 * | 2/2022 | ................ C10L 1/06 |

* cited by examiner

PROCESS TO CONVERT LIGHT ALKANES TO DIESEL

TECHNICAL FIELD

This relates to a process for converting light alkanes to diesel, especially diesel having a cetane number of at least 35.

BACKGROUND

The shale boom in the U.S. and elsewhere has significantly increased natural gas and natural gas liquid production. The shale boom combined with the increasing regulation of the volatility of transportation fuels has resulted in an abundant supply of light alkanes. Accordingly, it would be desirable to develop a technology to upgrade light alkanes such as propane, butanes, or pentanes to higher value products such as high cetane diesel.

GENERAL DESCRIPTION

The subject matter described in this document and recited in the claims represents a technological improvement in the form of a process for converting light alkanes in a feed into a diesel product. In general, the process includes three steps. The first step is to convert the light alkanes in the feed into aromatic hydrocarbons using an aromatization catalyst. The second step is to convert the aromatic hydrocarbons into diesel range hydrocarbons in a hydroalkylation process using a hydroalkylation catalyst. The third step is to hydrogenate the diesel range hydrocarbons to produce a diesel product having a cetane number of at least 35.

In some embodiments, a method includes any combination of one or more of the following: reacting a feed rich in one or more light alkanes with an aromatization catalyst to convert the one or more light alkanes to aromatic hydrocarbons and produce a first effluent including the aromatic hydrocarbons; separating the first effluent into a gas product that is primarily hydrogen and C1-C4 hydrocarbons and a first liquid product that is primarily gasoline range hydrocarbons and includes the aromatic hydrocarbons; reacting the first liquid product with a hydroalkylation catalyst to convert the aromatic hydrocarbons into diesel range hydrocarbons and produce a second effluent; separating the second effluent into a second liquid product that is primarily gasoline range hydrocarbons and a third liquid product that is primarily diesel range hydrocarbons; and hydrogenating the third liquid product to produce a diesel product having a cetane number of at least 35.

In some embodiments, the feed includes at least 50 wt % C1-C5 hydrocarbons. In some embodiments, the feed includes at least 50 wt % C3-C5 hydrocarbons. In some embodiments, the aromatization catalyst includes a zeolite material and a metal oxide.

In some embodiments, the aromatization catalyst includes 0.1-10 wt % of the metal oxide. In some embodiments, the metal oxide includes at least one of zinc oxide or gallium oxide. In some embodiments, wherein the metal oxide includes a rare earth metal oxide. In some embodiments, the aromatization catalyst includes phosphorous.

In some embodiments, at least 30 wt % of the C1-C5 hydrocarbons in the feed are converted to C5 or higher hydrocarbons in the first effluent. In some embodiments, the first liquid product includes at least 60 wt % C6-C10 hydrocarbons.

In some embodiments, the hydroalkylation catalyst includes a zeolite material and an active metal. In some embodiments, the active metal includes ruthenium and/or palladium. In some embodiments, at least 30 wt % of BTXE in the first liquid product is converted to the diesel range hydrocarbons. In some embodiments, the diesel product has a cetane number of at least 40.

In some embodiments, a method includes any combination of one or more of the following: reacting a feed rich in one or more light alkanes with an aromatization catalyst to convert the one or more light alkanes to aromatic hydrocarbons and produce a first effluent including the aromatic hydrocarbons, the feed including at least 50 wt % C1-C5 hydrocarbons; separating the first effluent into a gas product that is primarily hydrogen and C1-C4 hydrocarbons and a first liquid product that is primarily gasoline range hydrocarbons and includes the aromatic hydrocarbons; reacting the first liquid product with a hydroalkylation catalyst to convert the aromatic hydrocarbons into diesel range hydrocarbons and produce a second effluent; separating the second effluent into a second liquid product that is primarily gasoline range hydrocarbons and a third liquid product that is primarily diesel range hydrocarbons; and hydrogenating the third liquid product to produce a diesel product.

In some embodiments, the feed includes at least 50 wt % C3-C5 hydrocarbons. In some embodiments, the aromatization catalyst includes: 40-90 wt % of a zeolite material; 0.1-10 wt % of a first metal oxide, the first metal oxide including at least one of zinc oxide or gallium oxide; and 0.2-4 wt % of a rare earth metal oxide. In some embodiments, the aromatization catalyst includes phosphorous. In some embodiments, at least 30 wt % of the C1-C5 hydrocarbons in the feed are converted to C5 or higher hydrocarbons in the first effluent. In some embodiments, at least 30 wt % of BTXE in the first liquid product is converted to the diesel range hydrocarbons.

The term "primarily" when used to refer to the quantity of one or more materials in a stream means at least 50 wt %.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which.

DETAILED DESCRIPTION OF EMBODIMENTS

Figure 1:
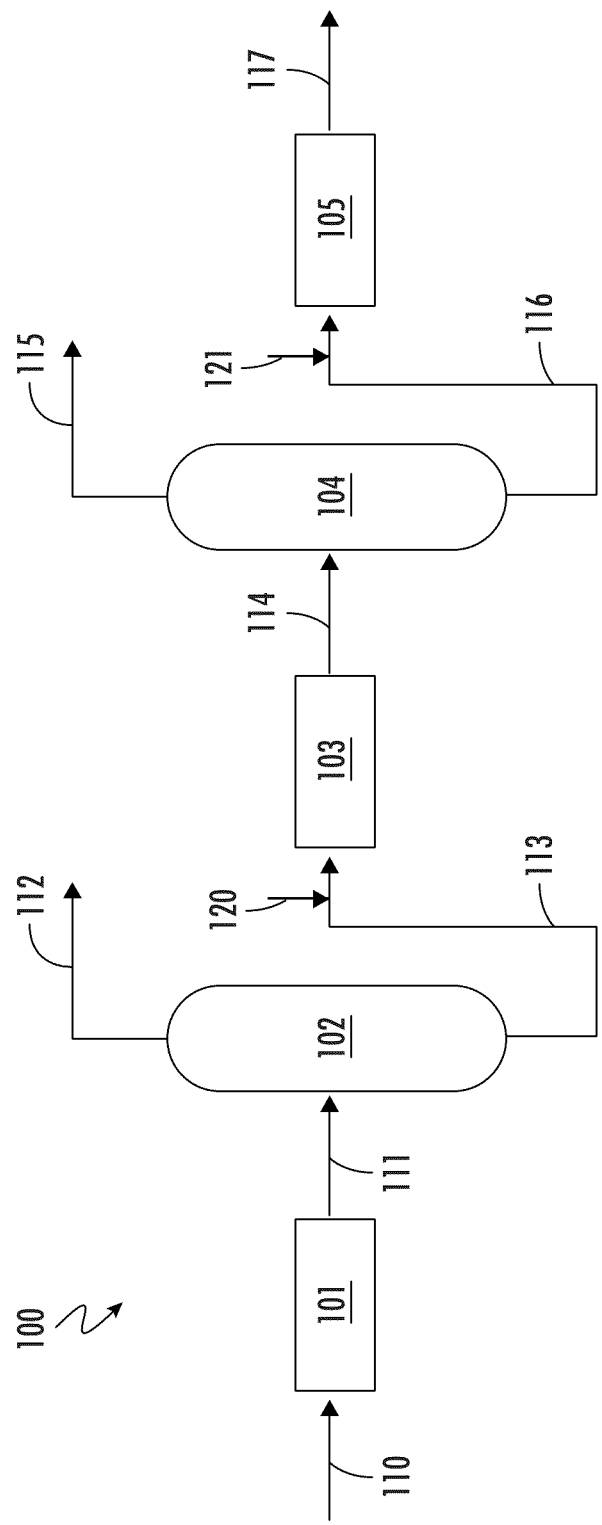
FIG. 1 is one embodiment of a process for converting light alkanes to diesel.

FIG. 1 shows one embodiment of a process 100 for converting light alkanes to diesel. A feed 110 (alternatively referred to as a feed stream) that is rich in light alkanes enters an aromatization reactor 101 having an aromatization catalyst that converts the light alkanes into aromatic hydrocarbons. In some embodiments, the aromatization reactor 101 includes a fixed bed catalytic reactor.

It should be appreciated that the feed 110 can include any suitable combination of one or more light alkanes. For example, in some embodiments, the feed 110 can include a single alkane or a mixture of alkanes having the same number of carbon atoms—e.g., C3 alkane, C4 alkanes, or C5 alkanes. In other embodiments, the feed 110 can include a mixture of alkanes having different numbers of carbon atoms—e.g., a mixture of any combination of C1-C5 alkanes, a mixture of any combination of C2-C5 alkanes, a mixture of any combination of C3-C5 alkanes, etc.

In some embodiments, the feed 110 includes at least 50 wt % C1-C5 hydrocarbons, at least 60 wt % C1-C5 hydrocarbons, at least 70 wt % C1-C5 hydrocarbons, at least 80 wt % C1-C5 hydrocarbons, at least 90 wt % C1-C5 hydrocarbons, at least 95 wt % C1-C5 hydrocarbons, at least 98 wt % C1-C5 hydrocarbons, or at least 100 wt % C1-C5 hydrocarbons. In other embodiments, the feed 110 includes 50-100 wt % C1-C5 hydrocarbons.

In some embodiments, the feed 110 includes at least 50 wt % C2-C5 hydrocarbons, at least 60 wt % C2-C5 hydrocarbons, at least 70 wt % C2-C5 hydrocarbons, at least 80 wt % C2-C5 hydrocarbons, at least 90 wt % C2-C5 hydrocarbons, at least 95 wt % C2-C5 hydrocarbons, at least 98 wt % C2-C5 hydrocarbons, or at least 100 wt % C2-C5 hydrocarbons. In some embodiments, the feed 110 includes 50-100 wt % C2-C5 hydrocarbons.

In some embodiments, the feed 110 includes at least 50 wt % C3-C5 hydrocarbons, at least 60 wt % C3-C5 hydrocarbons, at least 70 wt % C3-C5 hydrocarbons, at least 80 wt % C3-C5 hydrocarbons, at least 90 wt % C3-C5 hydrocarbons, at least 95 wt % C3-C5 hydrocarbons, at least 98 wt % C3-C5 hydrocarbons, or at least 100 wt % C3-C5 hydrocarbons. In some embodiments, the feed 110 includes 50-100 wt % C3-C5 hydrocarbons.

It should be appreciated that any aromatization catalyst can be used to convert the light alkanes into aromatic hydrocarbons. In some embodiments, the aromatization catalyst includes a zeolite material and one or more metal oxides. In some embodiments, the zeolite material has a molar ratio of $SiO_2/Al_2O_3$ of 10-300 or 10-200. In other embodiments, the zeolite material has a molar ratio of $SiO_2/Al_2O_3$ of at least 10 or at least 20. In other embodiments, the zeolite material has a molar ratio of $SiO_2/Al_2O_3$ of no more than 300 or no more than 200. In some embodiments, the zeolite material includes at least one of ZSM-5 or ZSM-11. In some embodiments, the aromatization catalyst includes 40-90 wt % of the zeolite material or 50-80 wt % of the zeolite material.

The aromatization catalyst can include any suitable amount of metal oxide. For example, in some embodiments, the aromatization catalyst includes at least 0.1 wt % of the metal oxide, at least 0.5 wt % of the metal oxide, or at least 1 wt % of the metal oxide. In other embodiments, the aromatization catalyst includes 0.1-10 wt % of the metal oxide, 0.5-8 wt % of the metal oxide, or 1-6 wt % of the metal oxide. In other embodiments, the aromatization catalyst includes no more than 10 wt % of the metal oxide, no more than 8 wt % of the metal oxide, or no more than 6 wt % of the metal oxide.

The aromatization catalyst can also include any suitable type of metal oxide. In some embodiments, the metal oxide includes at least one of zinc oxide or gallium oxide. In other embodiments, the metal oxide includes one or more rare earth metal oxides. For example, the rare earth metal oxide can include at least one of lanthanum oxide or cerium oxide. In other embodiments, the metal oxide includes one or more refractory metal oxides. For example, the refractory metal oxide can include at least one of molybdenum oxide or titanium oxide.

The aromatization catalyst can include multiple metal oxides. For example, the aromatization catalyst can include a first metal oxide and a second metal oxide. The first and second metal oxides can be any of the metal oxides described above. In some embodiments, the first metal oxide includes at least one of zinc oxide or gallium oxide and the second metal oxide includes at least one of a rare earth metal oxide (e.g., lanthanum oxide, cerium oxide, etc.), a refractory metal oxide (molybdenum oxide, titanium oxide, etc.), or copper oxide.

The aromatization catalyst can include any suitable quantity of the first and second metal oxides. For example, in some embodiments, the aromatization catalyst includes at least 0.1 wt % of the first metal oxide, at least 0.5 wt % of the first metal oxide, or at least 1 wt % of the first metal oxide and/or at least 0.1 wt % of the second metal oxide, at least 0.2 wt % of the second metal oxide, or at least 0.3 wt % of the second metal oxide. In other embodiments, the aromatization catalyst includes 0.1-10 wt % of the first metal oxide, 0.5-8 wt % of the first metal oxide, or 1-6 wt % of the first metal oxide and/or 0.1-5 wt % of the second metal oxide, 0.2-4 wt % of the second metal oxide, or 0.3-3 wt % of the second metal oxide. In other embodiments, the aromatization catalyst includes no more than 10 wt % of the first metal oxide, no more than 8 wt % of the first metal oxide, or no more than 6 wt % of the first metal oxide and/or no more than 5 wt % of the second metal oxide, no more than 4 wt % of the second metal oxide, or no more than 3 wt % of the second metal oxide.

The aromatization catalyst can also include a material such as phosphorus. For example, in some embodiments, the aromatization catalyst includes at least 0.1 wt % of phosphorous, at least 0.2 wt % of phosphorous, or at least 0.3 wt % of phosphorous. In other embodiments, the aromatization catalyst includes 0.1-5 wt % of phosphorous, 0.2-4 wt % of phosphorous, or 0.3-3 wt % of phosphorous. In other embodiments, the aromatization catalyst includes no more than 5 wt % of phosphorous, no more than 4 wt % of phosphorous, or no more than 3 wt % of phosphorous.

The aromatization catalyst can also include any suitable binder in any suitable amount. In some embodiments, the binder includes at least one of alumina or silica.

In general, it is desirable to convert as many of the light alkanes in the feed 110 to aromatic hydrocarbons in the first effluent 111. In some embodiments, at least 30 wt % of the C1-C5 hydrocarbons in the feed 110 are converted to C5 or higher hydrocarbons in the first effluent 111 or at least 40 wt % of the C1-C5 hydrocarbons in the feed 110 are converted to C5 or higher hydrocarbons in the first effluent 111. In some embodiments, at least 60 wt % of C4 hydrocarbons in the feed 110 are converted to C5 or higher hydrocarbons in the first effluent 111, or at least 70 wt % of the C4 hydrocarbons in the feed 110 are converted to C5 or higher hydrocarbons in the first effluent 111 or at least 80 wt % of the C4 hydrocarbons in the feed 110 are converted to C5 or higher hydrocarbons in the first effluent 111. In any of these embodiments, the C5 or higher hydrocarbons include aromatic hydrocarbons.

The aromatization reactor 101 produces a first effluent 111 (alternatively referred to as a first effluent stream) that is separated in a first separation unit 102 into a gas product 112 (alternatively referred to as a gas stream) and a first liquid product 113 (alternatively referred to as a first liquid stream). The gas product 112 is primarily hydrogen and C1-C4 hydrocarbons and a small amount of C5+ hydrocarbons. For example, the gas product 112 can include hydrogen, methane, ethane, ethylene, propane, propylene, butanes, and/or butenes. In some embodiments, the gas product 112 includes no more than a selected value in the range of 0.1-30 wt % of C5+ hydrocarbons—e.g., no more than 0.1 wt % C5+ hydrocarbons, no more than 5 wt % C5+ hydrocarbons, or no more than 22 wt % C5+ hydrocarbons (any value in the range can be selected).

The first liquid product 113 is primarily gasoline range hydrocarbons including the aromatic carbons formed in the aromatization reactor 101—e.g., benzene, toluene, xylenes, and ethylbenzene (BTXE). In some embodiments, the first liquid product 113 includes at least 60 wt % C6-C10 hydrocarbons, at least 70 wt % C6-C10 hydrocarbons, at least 80 wt % C6-C10 hydrocarbons, or at least 90 wt % C6-C10 hydrocarbons. In other embodiments, the first liquid product 113 includes 50-100 wt % C6-C10 hydrocarbons. In other embodiments, the first liquid product 113 includes at least 30 wt % of BTXE, at least 40 wt % of BTXE, at least 50 wt % of BTXE, or at least 60 wt % of BTXE.

The first liquid product 113 and hydrogen gas 120 (alternatively referred to as hydrogen gas stream) react in a hydroalkylation reactor 103 having a hydroalkylation catalyst to convert the aromatic hydrocarbons in the first liquid product 113 to diesel range hydrocarbons. In some embodiments, the hydroalkylation reactor 103 includes a fixed bed catalytic reactor.

It should be appreciated that the hydroalkylation catalyst can be any suitable catalyst capable of converting the aromatic hydrocarbons in the first liquid product 113 to diesel range hydrocarbons. In some embodiments, the hydroalkylation catalyst includes a zeolite material and an active metal.

The hydroalkylation catalyst can include any suitable zeolite material in any suitable quantity. For example, in some embodiments, the zeolite material has a molar ratio of $SiO_2/Al_2O_3$ of 10-200 or 10-100. In other embodiments, the zeolite material has a molar ratio of $SiO_2/Al_2O_3$ of at least 10, or at least 20. In other embodiments, the zeolite material has a molar ratio of $SiO_2/Al_2O_3$ of no more than 200 or no more than 100. In some embodiments, the zeolite material includes an organosilicon microporous zeolite. In some embodiments, the hydroalkylation catalyst includes 40-90 wt % of the zeolite material or 50-80 wt % of the zeolite material.

The hydroalkylation catalyst can include any suitable active metal in any suitable quantity. For example, in some embodiments, the active metal includes a noble metal (e.g., ruthenium and/or palladium), nickel, and/or cobalt. In some embodiments, the hydroalkylation catalyst includes at least 0.05 wt % of the active metal, at least 0.1 wt % of the active metal, or at least 0.5 wt % of the active metal. In other embodiments, the hydroalkylation catalyst includes 0.05-5 wt % of the active metal, 0.1-4 wt % of the active metal, or 0.5-3 wt % of the active metal. In other embodiments, the hydroalkylation catalyst includes no more than 5 wt % of the active metal, no more than 4 wt % of the active metal, or no more than 3 wt % of the active metal.

The hydroalkylation catalyst can also include one or more transition metals in addition to the active metal. In some embodiments, the transition metal includes at least one of vanadium, chromium, manganese, iron, cobalt, nickel, copper, or zinc. The transition metal can be included in any suitable quantity. In some embodiments, the hydroalkylation catalyst includes 0.05-10 wt % of the transition metal, 0.1-8 wt % of the transition metal, or 0.5-6 wt % of the transition metal.

The hydroalkylation catalyst can also include one or more metal oxides in addition to the active metal. For example, in some embodiments, the metal oxide includes a rare earth metal oxide or zinc oxide. The metal oxide can be included in any suitable quantity. In some embodiments, the hydroalkylation catalyst includes 1-20 wt % of the metal oxide, 2-17 wt % of the metal oxide, or 3-12 wt % of the metal oxide.

The hydroalkylation catalyst also includes a binder. In some embodiments, the hydroalkylation catalyst includes 10-60 wt % of the binder or 20-50 wt % of the binder. In some embodiments, the binder includes at least one of aluminum oxide, titanium oxide, zinc oxide, or zirconium oxide.

In general, it is desirable to convert as much of the aromatic hydrocarbons in the first liquid product 113 (e.g., BTXE) to the diesel range hydrocarbons. In some embodiments, at least 30 wt % of BTXE in the first liquid product 113 is converted to the diesel range hydrocarbons, or at least 35 wt % of BTXE in the first liquid product 113 is converted to the diesel range hydrocarbons.

The hydroalkylation reactor 103 produces a second effluent 114 (alternatively referred to as a second effluent stream) that is separated in a second separation unit 104 into a second liquid product 115 (alternatively a second liquid stream) that is primarily gasoline range hydrocarbons and a third liquid product 116 (alternatively a third liquid stream) that is primarily diesel range hydrocarbons.

The third liquid product 116 and hydrogen gas 121 (alternatively referred to as hydrogen gas stream) react in a hydrogenation reactor 105 using a hydrogenation catalyst to hydrogenate the diesel range hydrocarbons and produce a diesel product 117. In some embodiments, the hydrogenation reactor 105 can be a refinery diesel hydrotreater.

It should be appreciated that any suitable hydrogenation catalyst can be used. Examples of suitable catalysts include palladium and/or platinum catalysts such as $Pd/Al_2O_3$, $Pt/Al_2O_3$, and the like. Refinery hydrotreating catalysts such as NiMo, CoMo, and CoNiMo are also suitable for the hydrogenation step.

In general, it is desirable for the diesel product 117 to meet the applicable specifications for diesel fuel. In some embodiments, the diesel product 117 is diesel fuel having a cetane number of at least 35 or at least 40. In some embodiments, the diesel product 117 has one or more of the following characteristics: primarily C12-C20 hydrocarbons, molecular weight range (g/mol) approximately 150-250, carbon/hydrogen wt % approximately 86.5/13.5, distillation temperature (° C.) 200-360, LHV energy content (MJ/kg) 43, LHV energy content (MJ/l) 35, HHV energy content (MJ/kg) 46, heat of vaporization (kJ/kg) 225-280.

EXAMPLES

The following examples are provided to further illustrate the disclosed subject matter. They should not be used to constrict or limit the scope of the claims in any way.

Example 1—Aromatization of Light Alkanes

A feed stream of n-butane was aromatized in a reactor with the zeolite-based catalyst described in Example 8 at 0.5 $hr^{-1}$ weight hourly space velocity (WHSV) and atmospheric pressure. The effluent from the reactor was separated into a C5+ liquid phase product and a gas phase product. The liquid phase product was a gasoline range hydrocarbon stream rich in aromatics such as benzene, toluene, xylenes, and ethylbenzene (BTXE). The gas phase product contained hydrogen, methane, ethane, ethylene, propane, propylene, butanes, butenes, and a small amount of C5+ hydrocarbons.

The n-butane conversion was measured on a daily basis by analyzing unconverted n-butane in the product stream with an on-line gas chromatograph. The reactor temperature was adjusted gradually to maintain the n-butane conversion at approximately 80%.

Figure 2:
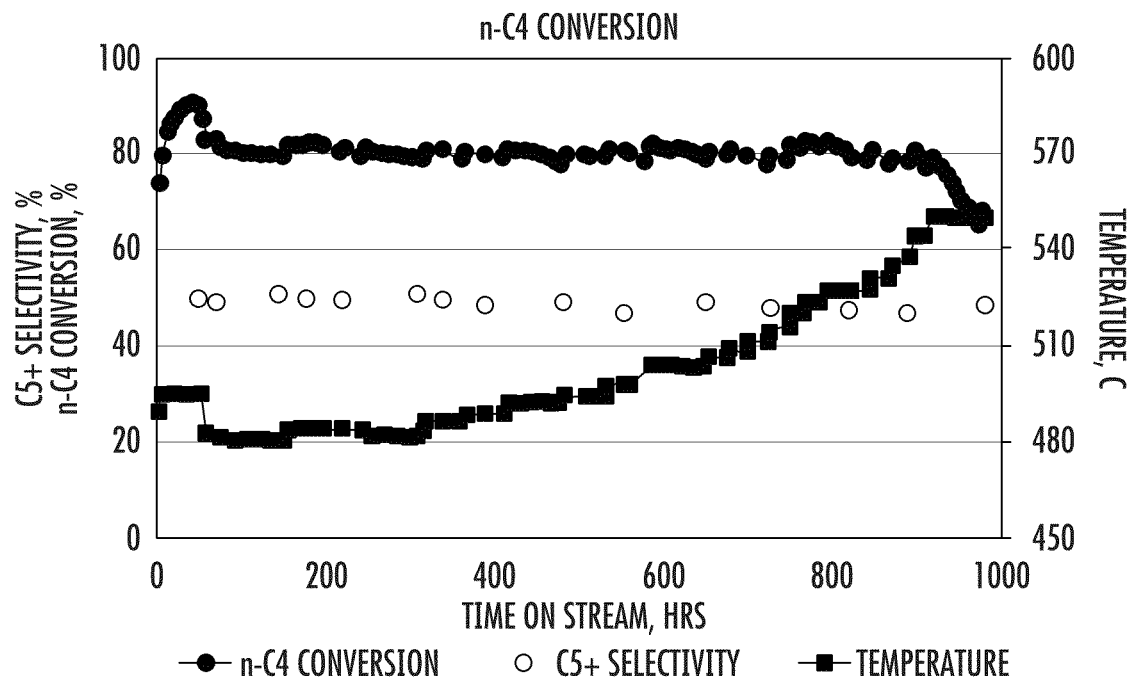
FIG. 2 is a graph showing the performance of one embodiment of a catalyst used to aromatize n-butane at 0.5 $hr^{-1}$ WHSV and atmospheric pressure.
Figure 3:
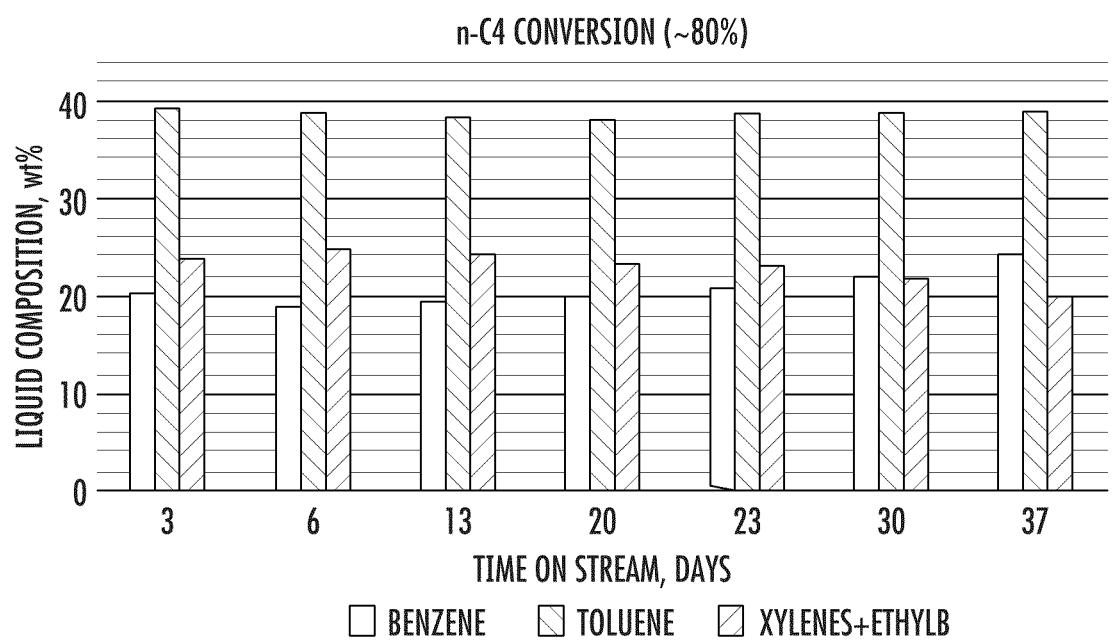
FIG. 3 is a graph showing the BTXE composition of the liquid product from the n-butane aromatization reaction.

The performance of the catalyst is shown in FIGS. 2-3. The catalyst showed good stability. The n-butane conversion rate was approximately 80% over 900+ hours of operation. The C5+ selectivity was approximately 50% near 1000 hours of operation. The liquid phase product included approximately 80% or more BTXE divided into the fractions shown in FIG. 3.

Example 2—Hydroalkylation of Liquid Phase Product

A feed stream of a simulated BTX mixture (30 wt % benzene, 46 wt % toluene, 20 wt % xylenes, and the balance n-heptane) was hydroalkylated in a reactor with the zeolite-based catalyst described in Example 19 at three different temperatures as shown in Table 1.

TABLE 1

| Run # | 1 | 2 | 3 |
|---|---|---|---|
| Temperature (° C.) | 150 | 165 | 180 |
| H2/Feed BTX molar ratio | 0.5 | 0.5 | 0.5 |
| Pressure (psig) | 150 | 150 | 150 |
| Liquid hourly space velocity (LHSV) (hr$^{-1}$) | 0.8 | 0.8 | 0.8 |
| Catalyst performance | | | |
| BTX conversion (%) | 38 | 40 | 42 |
| Diesel selectivity (%) | 75 | 81 | 79 |

The process achieved greater than 75% selectivity towards diesel range hydrocarbons in all three runs. No gas phase hydrocarbons were detected.

Example 3—Hydrogenation of Liquid Phase Product

The effluent from Example 2 was hydrogenated in a reactor using a 0.3 wt % Pd/Al$_2$O$_3$ catalyst operated at 400 psig, 0.5 hr$^{-1}$, and 100° C. The resulting diesel products were evaluated to determine their cetane numbers using the ASTM D613 method and their boiling point curves using the ASTM D2887 method. The cetane numbers for all three diesel samples are shown in Table 2.

TABLE 2

| Sample | Cetane No. |
|---|---|
| BTX feed @150 C. | 46.2 |
| BTX feed @165 C. | 45.4 |
| BTX feed @180 C. | 45.2 |

Figure 4:
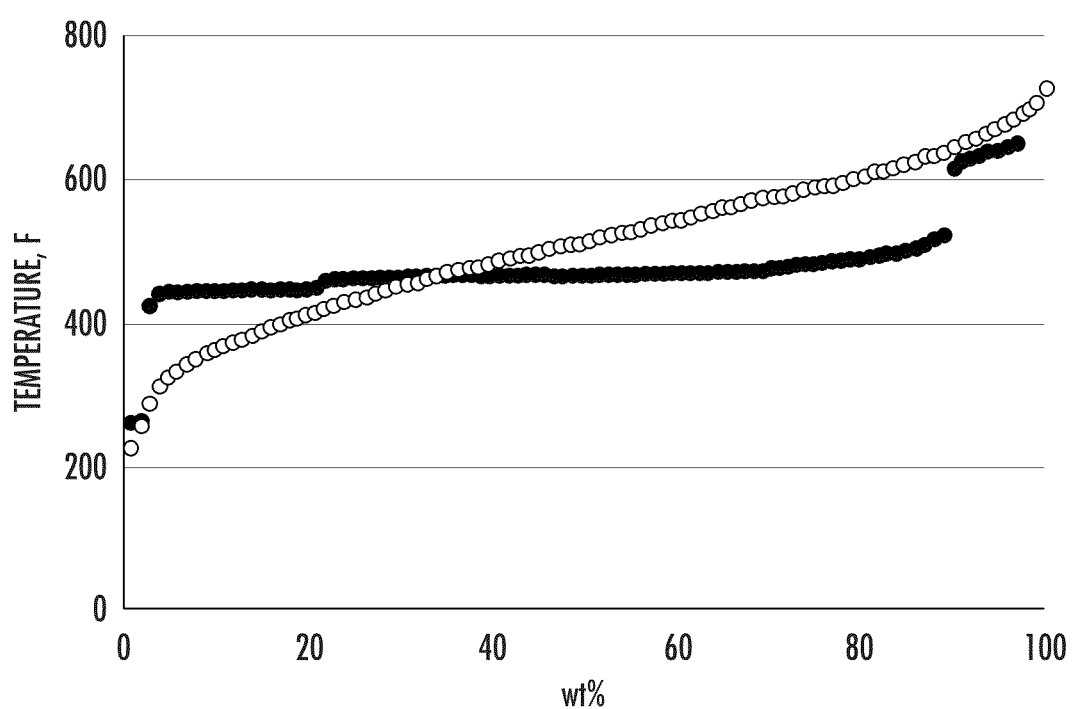
FIG. 4 is a graph showing the simulated distillation curves of a refinery ultra-low sulfur diesel (ULSD) and a diesel product made in Example 3.

The results show that the cetane numbers for all three diesel samples exceed the US diesel cetane specification of 40. FIG. 4 shows the simulated distillation curves of a refinery ultra-low sulfur diesel (ULSD) (the white line) and the diesel produced by the BTX feed@180C (the black line). The boiling point of the diesel product is in the middle of the ULSD's boiling point range and fits in the diesel pool well.

Example 4—Aromatization Catalyst 1A

Ammonium ZSM-5 molecular sieve powder (77 g) (molar ratio of SiO$_2$/Al$_2$O$_3$ of 40) is uniformly mixed with pseudo-boehmite (82 g). The mixture is combined with an aqueous nitric acid solution (30 g; 0.8 wt % nitric acid) and kneaded for 2 hours. It is extruded, dried at 80° C. for 24 hours, and calcined at 550° C. for 4 hours to form a catalyst carrier having a hydrogen ZSM-5 content of 60 wt %.

The catalyst carrier (30 g) is impregnated with an impregnation solution (30 g) containing: zinc nitrate (6 wt %), lanthanum nitrate (2.2 wt %), copper nitrate (2 wt %), and phosphoric acid (2 wt %). The catalyst carrier is impregnated with the impregnation solution for 5 hours, dried at 120° C. for 12 hours, and calcined at 550° C. for 4 hours to form the catalyst. The content of the catalyst is analyzed using Inductively Coupled Plasma Emission Spectroscopy (ICP) and it includes: zinc oxide (2 wt %), lanthanum oxide (1.1 wt %), copper oxide (1.3 wt %), and phosphorous content (1.1 wt %).

Example 5—Aromatization Catalyst 1B

Ammonium ZSM-5 molecular sieve powder (90 g) (molar ratio of SiO$_2$/Al$_2$O$_3$ of 100) is uniformly mixed with pseudoboehmite (82 g). The mixture is combined with an aqueous nitric acid solution (30 g; 0.8 wt % nitric acid) and kneaded for 2 hours. It is extruded, dried at 80° C. for 24 hours, and calcined at 550° C. for 4 hours to form a catalyst carrier having a hydrogen ZSM-5 content of 62 wt %.

The catalyst carrier (30 g) is impregnated with an impregnation solution (30 g) containing: zinc nitrate (10 wt %), lanthanum nitrate (3 wt %), copper nitrate (5 wt %), and phosphoric acid (3 wt %). The catalyst carrier is impregnated with the impregnation solution for 5 hours, dried at 120° C. for 12 hours, and calcined at 550° C. for 4 hours to form the catalyst. The content of the catalyst is analyzed using Inductively Coupled Plasma Emission Spectroscopy (ICP) and it includes: zinc oxide (4.2 wt %), lanthanum oxide (1.4 wt %), copper oxide (2.9 wt %), and phosphorous content (1.5 wt %).

Example 6—Aromatization Catalyst 1C

Ammonium ZSM-11 molecular sieve powder (90 g) (molar ratio of SiO$_2$/Al$_2$O$_3$ of 70) is uniformly mixed with pseudoboehmite (82 g). The mixture is combined with an aqueous nitric acid solution (30 g; 0.8 wt % nitric acid) and kneaded for 2 hours. It is extruded, dried at 80° C. for 24 hours, and calcined at 550° C. for 4 hours to form a catalyst carrier having a hydrogen ZSM-11 content of 62 wt %.

The catalyst carrier (40 g) is impregnated with an impregnation solution (30 g) containing: zinc nitrate (10 wt %), cerium nitrate (1.8 wt %), copper nitrate (5 wt %), and phosphoric acid (3 wt %). The catalyst carrier is impregnated with the impregnation solution for 5 hours, dried at 120° C. for 12 hours, and calcined at 550° C. for 4 hours to form the catalyst. The content of the catalyst is analyzed using Inductively Coupled Plasma Emission Spectroscopy (ICP) and it includes: zinc oxide (4.2 wt %), cerium oxide (0.9 wt %), copper oxide (2.9 wt %), and phosphorous content (1.5 wt %).

Example 7—Aromatization Catalyst 1D

Ammonium ZSM-11 molecular sieve powder (90 g) (molar ratio of $SiO_2/Al_2O_3$ of 70) is uniformly mixed with pseudoboehmite (82 g). The mixture is combined with an aqueous nitric acid solution (30 g; 0.8 wt % nitric acid) and kneaded for 2 hours. It is extruded, dried at 80° C. for 24 hours, and calcined at 550° C. for 4 hours to form a catalyst carrier having a hydrogen ZSM-11 content of 62 wt %.

The catalyst carrier (30 g) is impregnated with an impregnation solution (30 g) containing: gallium nitrate (8.6 wt %), lanthanum nitrate (3.2 wt %), copper nitrate (4.6 wt %), and phosphoric acid (4 wt %). The catalyst carrier is impregnated with the impregnation solution for 5 hours, dried at 120° C. for 12 hours, and calcined at 550° C. for 4 hours to form the catalyst. The content of the catalyst is analyzed using Inductively Coupled Plasma Emission Spectroscopy (ICP) and it includes: gallium oxide (5.1 wt %), lanthanum oxide (1.7 wt %), copper oxide (3.2 wt %), and phosphorous content (2.1 wt %).

Example 8—Aromatization Catalyst 1E

Ammonium ZSM-5 molecular sieve powder (100 g) ($Na_2O$ content of less than 0.1 wt % and a molar ratio of $SiO_2/Al_2O_3$ of 60) is uniformly mixed with pseudoboehmite (40 g) ($Na_2O$ content less than 0.15 wt %). The mixture is combined with an aqueous nitric acid solution (60 g; 0.5 wt % nitric acid) and kneaded for 2 hours. It is extruded into a cylindrical shape, dried at 80° C. for 24 hours, and calcined at 550° C. for 4 hours to form a catalyst carrier having a hydrogen ZSM-5 content of 70 wt %.

The catalyst carrier (30 g) is impregnated with an impregnation solution (30 g) containing: zinc nitrate (6 wt %), lanthanum nitrate (3 wt %), gallium nitrate (1 wt %), and phosphoric acid (1 wt %). The catalyst carrier is impregnated with the impregnation solution at ambient temperature for 5 hours, dried at 120° C. for 12 hours, and calcined at 550° C. for 3 hours to form a catalyst precursor.

The catalyst precursor is repeatedly immersed in an impregnation solution and dried to form the catalyst. This is done by repeating the following procedure three times. The catalyst precursor (30 g) is added to a solution of phenylmethylsiloxane (4.0 g) and n-hexane (200 ml) and allowed to stand for 10 hours and then dried at 120° C. to remove the n-hexane. The dried residue is heated in a muffle furnace and cooled naturally. The content of the catalyst is analyzed using Inductively Coupled Plasma Emission Spectroscopy (ICP) and it includes: zinc (2 wt %), lanthanum (1.2 wt %), gallium (0.9 wt %), and phosphorous (1.0 wt %).

Example 9—Aromatization Catalyst 2A

Ammonium ZSM-5 molecular sieve powder (100.0 g) ($Na_2O$ content of less than 0.1 wt % and a molar ratio of $SiO_2/Al_2O_3$ of 60) is uniformly mixed with pseudoboehmite (55.1 g) ($Na_2O$ content less than 0.15 wt %). The mixture is combined with a solution of chemically pure zinc nitrate (0.9 g) ($Zn(NO_3)_2 \cdot 6H_2O$), chemically pure nitric acid (2 ml), and water (60 ml) and mixed thoroughly. The mixture is kneaded, extruded, dried at 110° C. for 12 hours, and calcined at 550° C. for 5 hours to form the catalyst. It has a weight ratio of zinc/hydrogen ZSM-5 molecular sieve/binder=0.6/75/25.

Example 10—Aromatization Catalyst 2B

The following materials are combined and mixed thoroughly: ammonium ZSM-5 molecular sieve powder (100.0 g) ($Na_2O$ content of less than 0.1 wt % and a molar ratio of $SiO_2/Al_2O_3$ of 120), silica sol (85.0 g) ($SiO_2$ content 40 wt %), chemically pure zinc nitrate (2.4 g) ($Zn(NO_3)_2 \cdot 6H_2O$), chemically pure cerium nitrate (0.4 g) ($Ce(NO_3)_3$), and a solution of chemically pure nitric acid (0.2 ml) and water (10 ml). The mixture is kneaded, extruded into a shape, dried at 110° C. for 12 hours, and calcined at 550° C. for 5 hours to form the catalyst. It has a weight ratio of zinc/cerium/hydrogen ZSM-5 molecular sieve/binder=1.0/0.3/75/25.

Example 11—Aromatization Catalyst 2C

The following materials are combined and mixed thoroughly: ammonium ZSM-5 molecular sieve powder (100.0 g) ($Na_2O$ content of less than 0.1 wt % and a molar ratio of $SiO_2/Al_2O_3$ of 88), silica sol (75.0 g) ($SiO_2$ content 40 wt %), chemically pure zinc nitrate (0.8 g) ($Zn(NO_3)_2 \cdot 6H_2O$), chemically pure ammonium heptamolybdate (0.51 g) (($NH_4)_6Mo7024.4H_2O$), and a solution of chemically pure nitric acid (1 ml) and water (10 ml). The mixture is kneaded, extruded into a shape, dried at 110° C. for 12 hours, and calcined at 550° C. for 5 hours to form the catalyst. It has a weight ratio of zinc/molybdenum/hydrogen ZSM-5 molecular sieve/binder=0.6/0.2/75/25.

Example 12—Aromatization Catalyst 2D

The following materials are combined and mixed thoroughly: ammonium ZSM-5 molecular sieve powder (40.0 g) ($Na_2O$ content of less than 0.1 wt % and a molar ratio of $SiO_2/Al_2O_3$ of 60), silica sol (22.5 g) ($SiO_2$ content 40 wt %), chemically pure zinc nitrate (3.4 g) ($Zn(NO_3)_2 \cdot 6H_2O$), chemically pure lanthanum nitrate (1.3 g) ($La(NO_3)_3 \cdot 6H_2O$), and a solution of chemically pure nitric acid (0.6 ml), and water (10 ml). The mixture is kneaded, extruded into a shape, dried at 110° C. for 12 hours, and calcined at 550° C. for 5 hours to form the catalyst. It has a weight ratio of zinc/lanthanum/hydrogen ZSM-5 molecular sieve/binder=4.1/1.0/80/20.

Example 13—Aromatization Catalyst 2E

The following materials are combined and mixed thoroughly: ammonium ZSM-5 molecular sieve powder (100.0 g) ($Na_2O$ content of less than 0.1 wt % and a molar ratio of $SiO_2/Al_2O_3$ of 38), silica sol (85.0 g) ($SiO_2$ content 40 wt %), chemically pure zinc nitrate (1.2 g) ($Zn(NO_3)_2 \cdot 6H_2O$), chemically pure titanate (0.5 g), and a solution of chemically pure nitric acid (0.2 ml), and water (10 ml). The mixture is kneaded, extruded into a shape, dried at 110° C. for 12 hours, and calcined at 550° C. for 5 hours to form the catalyst. It has a weight ratio of zinc/titanium/hydrogen ZSM-5 molecular sieve/binder=1.0/0.3/75/25.

Example 14—Aromatization Catalyst 2F

The following materials are combined and mixed thoroughly: ammonium ZSM-5 molecular sieve powder (100.0 g) ($Na_2O$ content of less than 0.1 wt % and a molar ratio of $SiO_2/Al_2O_3$ of 100), silica sol (85.0 g) ($SiO_2$ content 40 wt %), chemically pure zinc nitrate (1.2 g) ($Zn(NO_3)_2 \cdot 6H_2O$), chemically pure ammonium dihydrogen phosphate (0.8 g), and a solution of chemically pure nitric acid (0.2 ml), and water (10 ml). The mixture is kneaded, extruded into a shape, dried at 110° C. for 12 hours, and calcined at 550° C.

for 5 hours to form the catalyst. It has a weight ratio of zinc/phosphorus/hydrogen ZSM-5 molecular sieve/binder=1.0/0.4/75/25.

Example 15—Aromatization Catalysts 2G-2L

Each of the aromatization catalysts 2A-2F is repeatedly immersed in an impregnation solution and dried to form aromatization catalysts 2G-2L, respectively. This is done by repeating the following procedure three times for each of the aromatization catalysts 2A-2F.

Each of the aromatization catalysts 2A-2F (30 g) is separately added to a solution of phenylmethylsiloxane and n-hexane (200 ml) and allowed to stand for 10 hours and then dried at 120° C. to remove the n-hexane. After drying, each residue is heated in a muffle furnace at 560° C. for 4 hours. The impregnation solution used with the aromatization catalysts 2A-2E included 4.0 g of phenylmethylsiloxane. The impregnation solution used with the aromatization catalyst 2F included 6.0 g of phenylmethylsiloxane.

Example 16—Aromatization Catalyst 2M

The aromatization catalyst is formed using the same procedure used to form aromatization catalyst 2J except the impregnation solution included 1.5 g of phenylmethylsiloxane.

Example 17—Aromatization Catalyst 2N

The aromatization catalyst is formed using the same procedure used to form aromatization catalyst 2J except tetraethyl orthosilicate is substituted for the phenylmethylsiloxane in the impregnation solution.

Example 18—Organosilicon Microporous Zeolite #1

Sodium aluminate (6.1 g) (42 wt % $Al_2O_3$) and sodium hydroxide (1.0 g) are added to water (288 ml) and the mixture is stirred until the sodium aluminate dissolves. Hexahydropyridine (34.0 g) is added to the solution while stirring. Solid silica (60.0 g) and trimethylchlorosilane (5.5 g) are also added. The molar ratio of the materials is shown in Table 3.

TABLE 3

| Reactants | Molar Ratio |
| --- | --- |
| $SiO_2/Al_2O_3$ | 40 |
| $NaOH/SiO_2$ | 0.025 |
| Trimethylchlorosilane/$SiO_2$ | 0.05 |
| Hexahydropyridine/$SiO_2$ | 0.5 |
| Water/$SiO_2$ | 16 |

The reaction mixture is stirred thoroughly and transferred to a stainless-steel reaction vessel where it crystalizes at 135° C. for 50 hours while stirring. The contents of the vessel are removed, filtered, washed, and dried. Chemical analysis reveals the molar ratio of $SiO_2$:$Al_2O_3$ is 42:1. The dried sample is analyzed and its $^{29}Si$ solid NMR spectrum shows a nuclear magnetic resonance peak at 15.1 ppm.

Example 19—Synthesis of Ru/MP Hydroalkylation Catalyst #1

The zeolite formed in Example 18 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst (the catalyst is a bifunctional catalyst).

Example 20—Synthesis of Pd/MP Hydroalkylation Catalyst #1

The zeolite formed in Example 18 (65 g of dry powder) and alumina (35 g) are combined and mixed. Palladium nitrate (100 g as a 5 wt % solution in dilute nitric acid for a final yield of 0.3 wt % palladium) ($Pd(NO_3)_2$) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 21—Synthesis of Pt/MP Hydroalkylation Catalyst #1

The zeolite formed in Example 18 (65 g of dry powder) and alumina (35 g) are combined and mixed. Platinum chlorate (100 g as a 5 wt % solution in dilute nitric acid for a final yield of 0.3 wt % platinum) ($Pt(ClO_3)_2$) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 22—Organosilicon Microporous Zeolite #2

Alumina (3.0 g) and sodium hydroxide (16.0 g) are added to water (450 ml) and the mixture is stirred until the alumina dissolves. Hexamethyleneimine (34.7 g) is added to the solution while stirring. Solid silica (60 g) and dimethyldiethoxysilane (5.9 g) are also added. The molar ratio of the materials is shown in Table 4.

TABLE 4

| Reactants | Molar Ratio |
| --- | --- |
| $SiO_2/Al_2O_3$ | 30 |
| $NaOH/SiO_2$ | 0.2 |
| Dimethyldiethoxysilane/$SiO_2$ | 0.04 |
| Hexamethyleneimine/$SiO_2$ | 0.35 |
| Water/$SiO_2$ | 25 |

The reaction mixture is stirred thoroughly and transferred to a stainless-steel reaction vessel where it crystalizes at 145° C. for 70 hours while stirring. The contents of the vessel are removed, filtered, washed, and dried. Chemical analysis reveals the molar ratio of $SiO_2$:$Al_2O_3$ is 30:1. The dried sample is analyzed and its $^{29}Si$ solid NMR spectrum shows a nuclear magnetic resonance peak at −18.9 ppm.

Example 23—Synthesis of Ru/MP Hydroalkylation Catalyst #2

The zeolite formed in Example 22 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 24—Synthesis of Pd/MP Hydroalkylation Catalyst #2

The zeolite formed in Example 22 (65 g of dry powder) and alumina (35 g) are combined and mixed. Palladium nitrate (100 g as a 5 wt % solution in dilute nitric acid for a final yield of 0.3 wt % palladium) (Pd(NO3)2) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 25—Synthesis of Ru—Ni/MP Hydroalkylation Catalyst #2

A solution (40 ml) of ruthenium chloride (RuCl3) and nickel nitrate (Ni(NO$_3$)$_2$) is prepared having 0.25 g of Ru, 0.23 g of nickel nitrate, and a molar ratio of Ru:Ni of 2. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (17.50 g) and a dilute nitric acid solution is added and the mixture is kneaded and extruded into strips (1.6 mm×2 mm). The strips are dried, calcined at 550° C. for 5 hours, exchanged 5 times with 1 M ammonium nitrate, filtered, and dried at 120° C. for 12 hours. The dried strips are calcined at 480° C. for 6 hours to form the catalyst. The catalyst includes: 0.5 wt % Ru, 0.2 wt % Ni, 34.8 wt % binder, and 64.5 wt % zeolite.

Example 26—Synthesis of Ru—Fe/MP Hydroalkylation Catalyst #2

A solution (40 ml) of ruthenium chloride (RuCl3) and iron nitrate (Fe(NO$_3$)$_3$) is prepared having 0.25 g of Ru, 0.30 g of iron nitrate, and a molar ratio of Ru:Fe of 2. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (17.50 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Ru, 0.2 wt % Fe, 34.8 wt % binder, and 64.5 wt % zeolite.

Example 27—Synthesis of Ru—Cu/MP Hydroalkylation Catalyst #2

A solution (40 ml) of ruthenium chloride (RuCl$_3$) and copper nitrate (Cu(NO$_3$)$_3$) is prepared having 0.25 g of Ru, 0.23 g of copper nitrate, and a molar ratio of Ru:Cu of 2. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (17.50 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Ru, 0.2 wt % Cu, 34.8 wt % binder, and 64.5 wt % zeolite.

Example 28—Synthesis of Pd—Ni/MP Hydroalkylation Catalyst #2

A solution (40 ml) of palladium nitrate (Pd(NO$_3$)$_2$) and nickel nitrate (Ni(NO$_3$)$_2$) is prepared having 0.25 g of Pd, 0.22 g of nickel nitrate, and a molar ratio of Pd:Ni of 2. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (17.50 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Pd, 0.2 wt % Ni, 34.8 wt % binder, and 64.5 wt % zeolite.

Example 29—Synthesis of Pd—Fe/MP Hydroalkylation Catalyst #2

A solution (40 ml) of palladium nitrate (Pd(NO$_3$)$_2$) and iron nitrate (Fe(NO$_3$)$_3$) is prepared having 0.25 g of Pd, 0.28 g of iron nitrate, and a molar ratio of Pd:Fe of 2. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (17.50 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Pd, 0.2 wt % Fe, 34.8 wt % binder, and 64.5 wt % zeolite.

Example 30—Synthesis of Pd—Cu/MP Hydroalkylation Catalyst #2

A solution (40 ml) of palladium nitrate (Pd(NO$_3$)$_2$) and copper nitrate (Cu(NO$_3$)$_2$) is prepared having 0.25 g of Pd, 0.22 g of copper nitrate, and a molar ratio of Pd:Cu of 2. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (17.50 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Pd, 0.2 wt % Cu, 34.8 wt % binder, and 64.5 wt % zeolite.

Example 31—Synthesis of Ru—CeO$_2$/MP Hydroalkylation Catalyst #2

A solution (40 ml) of ruthenium chloride (RuCl$_3$) and cerium nitrate (Ce(NO$_3$)$_3$) is prepared having 0.25 g of Ru, 16.13 g of cerium nitrate, and a molar ratio of Ru:Ce of 1:20. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (8.98 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Ru, 17.0 wt % CeO$_2$, 18.0 wt % binder, and 65.0 wt % zeolite.

Example 32—Synthesis of Ru—ZrO$_2$/MP Hydroalkylation Catalyst #2

A solution (40 ml) of ruthenium chloride (RuCl$_3$) and zirconium nitrate (Zr(NO$_3$)$_4$) is prepared having 0.25 g of Ru, 16.78 g of zirconium nitrate, and a molar ratio of Ru:Zr of 1:20. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (11.4 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Ru, 12.2 wt % ZrO2, 22.8 wt % binder, and 65.0 wt % zeolite.

Example 33—Synthesis of Ru—La$_2$O$_3$/MP Hydroalkylation Catalyst #2

A solution (40 ml) of ruthenium chloride (RuCl$_3$) and lanthanum nitrate (La(NO$_3$)$_3$) is prepared having 0.25 g of Ru, 16.07 g of lanthanum nitrate, and a molar ratio of Ru:La of 1:20. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (9.43 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Ru, 16.1 wt % La$_2$O$_3$, 18.9 wt % binder, and 65.0 wt % zeolite.

Example 34—Synthesis of Pd—CeO$_2$/MP Hydroalkylation Catalyst #2

A solution (40 ml) of palladium nitrate (Pd(NO$_3$)$_2$) and cerium nitrate (Ce(NO$_3$)$_3$) is prepared having 0.25 g of Pd, 16.13 g of cerium nitrate, and a molar ratio of Pd:Ce of 1:20. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (8.98 g) and a dilute nitric acid solution is added and the mixture is kneaded and extruded into strips (1.6 mm×2 mm). The strips are dried, calcined at 550° C. for 5 hours, exchanged 5 times with 1 M ammonium nitrate, filtered, and dried at 120° C. for 12 hours. The dried strips are calcined at 480° C. for 6 hours to form the catalyst. The catalyst includes: 0.5 wt % Pd, 17.0 wt % CeO$_2$, 18.0 wt % binder, and 65.0 wt % zeolite.

Example 35—Synthesis of Pd—ZrO2/MP Hydroalkylation Catalyst #2

A solution (40 ml) of palladium nitrate (Pd(NO$_3$)$_2$) and zirconium nitrate (Zr(NO$_3$)$_4$) is prepared having 0.25 g of Pd, 16.78 g of zirconium nitrate, and a molar ratio of Pd:Zr of 1:20. The solution is sprayed on a sample of the zeolite formed in Example 22 (32.50 g dry powder) while stirring. The mixture is dried at room temperature and pressure for 10 hours, dried at 120° C. for an additional 10 hours, and ground into a powder. Alumina (11.40 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Pd, 12.2 wt % ZrO$_2$, 22.8 wt % binder, and 65.0 wt % zeolite.

Example 36—Synthesis of Pd—La$_2$O$_3$/MP Hydroalkylation Catalyst #2

A solution (40 ml) of palladium nitrate (Pd(NO$_3$)$_2$) and lanthanum nitrate (La(NO$_3$)$_3$) is prepared having 0.25 g of Pd, 16.07 g of lanthanum nitrate, and a molar ratio of Pd:La of 1:20. The solution is sprayed on a sample of the zeolite formed in Example 22 (32.5 g dry powder) while stirring. The mixture is dried at room temperature and pressure for 10 hours, dried at 120° C. for an additional 10 hours, and ground into a powder. Alumina (9.43 g) and a dilute nitric acid solution is added and the mixture is kneaded and extruded into extrudates (1.6 mm×2 mm). The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst. The catalyst includes: 0.5 wt % Pd, 16.1 wt % La$_2$O$_3$, 18.9 wt % binder, and 65.0 wt % zeolite.

Example 37—Organosilicon Microporous Zeolite #3

Sodium aluminate (3.5 g) (42 wt % Al$_2$O$_3$) and sodium hydroxide (8.0 g) are added to water (540 ml) and the mixture is stirred until the sodium aluminate dissolves. Hexamethyleneimine (30 g) is added to the solution while stirring. Solid silica (60 g) and hexamethyldisiloxane (8.0 g) are also added. The molar ratio of the materials is shown in Table 5.

TABLE 5

| Reactants | Molar Ratio |
| --- | --- |
| $SiO_2/Al_2O_3$ | 70 |
| $NaOH/SiO_2$ | 0.2 |
| Hexamethyldisiloxane/$SiO_2$ | 0.05 |
| Hexamethyleneimine/$SiO_2$ | 0.3 |
| Water/$SiO_2$ | 30 |

The reaction mixture is stirred thoroughly and transferred to a stainless-steel reaction vessel where it crystallizes at 135° C. for 35 hours while stirring. The contents of the vessel are removed, filtered, washed, and dried. Chemical analysis reveals the molar ratio of $SiO_2$:$Al_2O_3$ is 68.5:1. The dried sample is analyzed and its $^{29}Si$ solid NMR spectrum shows a nuclear magnetic resonance peak at 16.8 ppm.

Example 38—Synthesis of Ru/MP Hydroalkylation Catalyst #3

The zeolite formed in Example 37 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 39—Synthesis of Pd/MP Hydroalkylation Catalyst #3

The zeolite formed in Example 37 (65 g of dry powder) and alumina (35 g) are combined and mixed. Palladium nitrate (100 g as a 5 wt % solution in dilute nitric acid for a final yield of 0.3 wt % palladium) (Pd(NO3)2) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 40—Organosilicon Microporous Zeolite #4

Sodium aluminate (8.0 g) (42 wt % $Al_2O_3$) and sodium hydroxide (4.0 g) are added to water (360 ml) and the mixture is stirred until the sodium aluminate dissolves. Hexahydropyridine (34.0 g) is added to the solution while stirring. Silica sol (150 g; 40 wt % silica content) and dimethyldichlorosilane (3.9 g) are also added. The molar ratio of the materials is shown in Table 6.

TABLE 6

| Reactants | Molar Ratio |
| --- | --- |
| $SiO_2/Al_2O_3$ | 30 |
| $NaOH/SiO_2$ | 0.05 |
| Dimethyldichlorosilane/$SiO_2$ | 0.03 |
| Hexahydropyridine/$SiO_2$ | 0.4 |
| Water/$SiO_2$ | 20 |

The reaction mixture is stirred thoroughly and transferred to a stainless-steel reaction vessel where it crystallizes at 150° C. for 55 hours while stirring. The contents of the vessel are removed, filtered, washed, and dried. Chemical analysis reveals the molar ratio of $SiO_2$:$Al_2O_3$ is 28.6:1. The dried sample is analyzed and its $^{29}Si$ solid NMR spectrum shows nuclear magnetic resonance peaks at 5.7 ppm and −16.4 ppm.

Example 41—Synthesis of Ru/MP Hydroalkylation Catalyst #4

The zeolite formed in Example 40 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 42—Synthesis of Pd/MP Hydroalkylation Catalyst #4

The zeolite formed in Example 40 (65 g of dry powder) and alumina (35 g) are combined and mixed. Palladium nitrate (100 g as a 5 wt % solution in dilute nitric acid for a final yield of 0.3 wt % palladium) (Pd(NO3)2) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 43—Organosilicon Microporous Zeolite #5

Sodium aluminate (2.4 g) (42 wt % $Al_2O_3$) and sodium hydroxide (4.0 g) are added to water (900 ml) and the mixture is stirred until the sodium aluminate dissolves. Hexamethyleneimine (20 g) is added to the solution while stirring. Solid silica (60 g) and divinyldichlorosilane (48.5 g) are also added. The molar ratio of the materials is shown in Table 7.

TABLE 7

| Reactants | Molar Ratio |
| --- | --- |
| $SiO_2/Al_2O_3$ | 100 |
| $NaOH/SiO_2$ | 1.0 |
| Divinyldichlorosilane/$SiO_2$ | 0.3 |
| Hexamethyleneimine/$SiO_2$ | 0.2 |
| Water/$SiO_2$ | 50 |

The reaction mixture is stirred thoroughly and transferred to a stainless-steel reaction vessel where it crystallizes at 135° C. for 35 hours while stirring. The contents of the vessel are removed, filtered, washed, and dried. Chemical analysis reveals the molar ratio of $SiO_2$:$Al_2O_3$ is 105.3:1. The dried sample is analyzed and its $^{29}Si$ solid NMR spectrum shows nuclear magnetic resonance peaks at 4.2 ppm and −17.5 ppm.

Example 44—Synthesis of Ru/MP Hydroalkylation Catalyst #5

The zeolite formed in Example 43 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 45—Synthesis of Pd/MP Hydroalkylation Catalyst #5

The zeolite formed in Example 43 (65 g of dry powder) and alumina (35 g) are combined and mixed. Palladium nitrate (100 g as a 5 wt % solution in dilute nitric acid for a final yield of 0.3 wt % palladium) (Pd(NO3)2) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 46—Organosilicon Microporous Zeolite #6

Sodium aluminate (16.1 g) (42 wt % $Al_2O_3$) and sodium hydroxide (2.0 g) are added to water (540 ml) and the mixture is stirred until the sodium aluminate dissolves. Hexamethyleneimine (30 g) is added to the solution while stirring. Solid silica (60 g) and hexamethyldisilazane (3.2 g) are also added. The molar ratio of the materials is shown in Table 8.

TABLE 8

| Reactants | Molar Ratio |
| --- | --- |
| $SiO_2/Al_2O_3$ | 15 |
| $NaOH/SiO_2$ | 0.05 |
| Hexamethyldisilazane/$SiO_2$ | 0.04 |
| Hexamethyleneimine/$SiO_2$ | 0.3 |
| Water/$SiO_2$ | 30 |

The reaction mixture is stirred thoroughly and transferred to a stainless-steel reaction vessel where it crystallizes at 145° C. for 38 hours while stirring. The contents of the vessel are removed, filtered, washed, and dried. Chemical analysis reveals the molar ratio of $SiO_2:Al_2O_3$ is 17.5:1. The dried sample is analyzed and its $^{29}Si$ solid NMR spectrum shows a nuclear magnetic resonance peak at 14.8 ppm.

Example 47—Synthesis of Ru/MP Hydroalkylation Catalyst #6

The zeolite formed in Example 46 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 48—Synthesis of Pd/MP Hydroalkylation Catalyst #6

The zeolite formed in Example 46 (65 g of dry powder) and alumina (35 g) are combined and mixed. Palladium nitrate (100 g as a 5 wt % solution in dilute nitric acid for a final yield of 0.3 wt % palladium) (Pd(NO3)2) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 49—Organosilicon Microporous Zeolite #7

Sodium aluminate (1.6 g) (42 wt % $Al_2O_3$) and sodium hydroxide (24 g) are added to water (720 ml) and the mixture is stirred until the sodium aluminate dissolves. Hexamethyleneimine (50 g) is added to the solution while stirring. Solid silica (60 g) and trimethoxyphenylsilane (19.8 g) are also added. The molar ratio of the materials is shown in Table 9.

TABLE 9

| Reactants | Molar Ratio |
| --- | --- |
| $SiO_2/Al_2O_3$ | 150 |
| $NaOH/SiO_2$ | 0.6 |
| Trimethoxyphenylsilane/$SiO_2$ | 0.1 |
| Hexamethyleneimine/$SiO_2$ | 0.5 |
| Water/$SiO_2$ | 40 |

The reaction mixture is stirred thoroughly and transferred to a stainless-steel reaction vessel where it crystallizes at 135° C. for 35 hours while stirring. The contents of the vessel are removed, filtered, washed, and dried. Chemical analysis reveals the molar ratio of $SiO_2:Al_2O_3$ is 142:1. The dried sample is analyzed and its $^{29}Si$ solid NMR spectrum shows a nuclear magnetic resonance peak at 17.1 ppm.

Example 50—Synthesis of Ru/MP Hydroalkylation Catalyst #7

The zeolite formed in Example 49 (65 g of dry powder) and alumina (35 g) are combined and mixed. Ruthenium chloride (100 g as a 5 wt % solution in dilute nitric acid for a final yield of 0.3 wt % ruthenium) (RuCl3) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 51—Synthesis of Pd/MP Hydroalkylation Catalyst #7

The zeolite formed in Example 49 (65 g of dry powder) and alumina (35 g) are combined and mixed. Palladium nitrate (100 g as a 5 wt % solution in dilute nitric acid for a final yield of 0.3 wt % palladium) (Pd(NO3)2) is added and the mixture is kneaded and extruded into extrudates. The extrudates are dried, calcined at 550° C. for 5 hours, exchanged 5 times with 1 M ammonium nitrate, filtered, and dried at 120° C. for 12 hours. The dried extrudates are calcined at 480° C. for 6 hours to form the catalyst.

Example 52—Reduction of Hydroalkylation Catalysts

The synthesized Metal/MP and Metal-Metal oxides/MP (Metal=Ru, Pd, Pt, Ru—Ni, Ru—Fe, Ru—Cu, Pd—Ni, Pd—Fe, Pd—Cu) catalysts described above are reduced in a fixed bed tubular reactor and the reductions are carried out at (300° C. for Ru, 250° C. for Pd and Pt, and 550° C. for Ru—Ni, Ru—Fe, Ru—Cu, Pd—Ni, Pd—Fe, and Pd—Cu) for 2 hours in the mixtures flow of H2 (40 STD mL/min) and N2 (60 STD mL/min). The reduced catalyst is purged with N2 while cooling down to room temperature.

ILLUSTRATIVE EMBODIMENTS

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A method comprising any combination of one or more of the following: reacting a feed rich in one or more light alkanes with an aromatization catalyst to convert the one or more light alkanes to aromatic hydrocarbons and produce a first effluent including the aromatic hydrocarbons; separating the first effluent into a gas product that is primarily hydrogen and C1-C4 hydrocarbons and a first liquid product that is primarily gasoline range hydrocarbons and includes the aromatic hydrocarbons; reacting the first liquid product with a hydroalkylation catalyst to convert the aromatic hydrocarbons into diesel range hydrocarbons and produce a second effluent; separating the second effluent into a second liquid product that is primarily gasoline range hydrocarbons and a third liquid product that is primarily diesel range hydrocarbons; and hydrogenating the third liquid product to produce a diesel product having a cetane number of at least 35.

P2. The method of paragraph P1 wherein the feed includes shale gas.

P3. The method of any one of paragraphs P1-P2 wherein the feed includes at least 50 wt % C1-C5 hydrocarbons (or alternatively at least 60 wt % C1-C5 hydrocarbons, at least 70 wt % C1-C5 hydrocarbons, at least 80 wt % C1-C5 hydrocarbons, at least 90 wt % C1-C5 hydrocarbons, at least 95 wt % C1-C5 hydrocarbons, at least 98 wt % C1-C5 hydrocarbons, or at least 100 wt % C1-C5 hydrocarbons).

P4. The method of any one of paragraphs P1-P3 wherein the feed includes 50-100 wt % C1-C5 hydrocarbons.

P5. The method of any one of paragraphs P1-P4 wherein the feed includes at least 50 wt % C2-C5 hydrocarbons (or alternatively at least 60 wt % C2-C5 hydrocarbons, at least 70 wt % C2-C5 hydrocarbons, at least 80 wt % C2-C5 hydrocarbons, at least 90 wt % C2-C5 hydrocarbons, at least 95 wt % C2-C5 hydrocarbons, at least 98 wt % C2-C5 hydrocarbons, or at least 100 wt % C2-C5 hydrocarbons).

P6. The method of any one of paragraphs P1-P5 wherein the feed includes 50-100 wt % C2-C5 hydrocarbons.

P7. The method of any one of paragraphs P1-P6 wherein the feed includes at least 50 wt % C3-C5 hydrocarbons (or alternatively at least 60 wt % C3-C5 hydrocarbons, at least 70 wt % C3-C5 hydrocarbons, at least 80 wt % C3-C5 hydrocarbons, at least 90 wt % C3-C5 hydrocarbons, at least 95 wt % C3-C5 hydrocarbons, at least 98 wt % C3-C5 hydrocarbons, or at least 100 wt % C3-C5 hydrocarbons).

P8. The method of any one of paragraphs P1-P7 wherein the feed includes 50-100 wt % C3-C5 hydrocarbons.

P9. The method of any one of paragraphs P1-P8 wherein the aromatization catalyst includes a zeolite material and one or more metal oxides.

P10. The method of paragraph P9 wherein the zeolite material has a molar ratio of $SiO_2/Al_2O_3$ of 10-300 (alternatively a molar ratio of $SiO_2/Al_2O_3$ of 10-200).

P11. The method of any one of paragraphs P9-P10 wherein the zeolite material has a molar ratio of $SiO_2/Al_2O_3$ of at least 10 (alternatively a molar ratio of $SiO_2/Al_2O_3$ of at least 20).

P12. The method of any one of paragraphs P9-P11 wherein the zeolite material has a molar ratio of $SiO_2/Al_2O_3$ of no more than 300 (alternatively a molar ratio of $SiO_2/Al_2O_3$ of no more than 200).

P13. The method of any one of paragraphs P9-P12 wherein the zeolite material includes at least one of ZSM-5 or ZSM-11.

P14. The method of any one of paragraphs P9-P13 wherein the aromatization catalyst includes 40-90 wt % of the zeolite material (alternatively the aromatization catalyst includes 50-80 wt % of the zeolite material).

P15. The method of any one of paragraphs P9-P14 wherein the aromatization catalyst includes at least 0.1 wt % of the metal oxide (alternatively at least 0.5 wt % of the metal oxide, or at least 1 wt % of the metal oxide).

P16. The method of any one of paragraphs P9-P15 wherein the aromatization catalyst includes 0.1-10 wt % of the metal oxide (alternatively 0.5-8 wt % of the metal oxide, or 1-6 wt % of the metal oxide).

P17. The method of any one of paragraphs P9-P16 wherein the aromatization catalyst includes no more than 10 wt % of the metal oxide (alternatively no more than 8 wt % of the metal oxide, or no more than 6 wt % of the metal oxide).

P18. The method of any one of paragraphs P9-P17 wherein the metal oxide includes at least one of zinc oxide or gallium oxide.

P19. The method of any one of paragraphs P9-P18 wherein the metal oxide includes one or more rare earth metal oxides.

P20. The method of paragraph P19 wherein the rare earth metal oxide includes at least one of lanthanum oxide or cerium oxide.

P21. The method of any one of paragraphs P9-P20 wherein the metal oxide includes one or more refractory metal oxides.

P22. The method of paragraph P21 wherein the refractory metal oxide includes at least one of molybdenum oxide or titanium oxide.

P23. The method of any one of paragraphs P9-P22 wherein the metal oxide is a first metal oxide, the aromatization catalyst including a second metal oxide.

P24. The method of paragraph P23 wherein the first metal oxide includes at least one of zinc oxide or gallium oxide and the second metal oxide includes at least one of a rare earth metal oxide (e.g., lanthanum oxide, cerium oxide, etc.), a refractory metal oxide (molybdenum oxide, titanium oxide, etc.), or copper oxide.

P25. The method of any one of paragraphs P23-P24 wherein the aromatization catalyst includes at least 0.1 wt % of the first metal oxide (alternatively at least 0.5 wt % of the first metal oxide, or at least 1 wt % of the first metal oxide) and at least 0.1 wt % of the second metal oxide (alternatively at least 0.2 wt % of the second metal oxide, or at least 0.3 wt % of the second metal oxide).

P26. The method of any one of paragraphs P23-P25 wherein the aromatization catalyst includes 0.1-10 wt % of the first metal oxide (alternatively 0.5-8 wt % of the first metal oxide, or 1-6 wt % of the first metal oxide) and 0.1-5 wt % of the second metal oxide (alternatively 0.2-4 wt % of the second metal oxide, or 0.3-3 wt % of the second metal oxide).

P27. The method of any one of paragraphs P23-P26 wherein the aromatization catalyst includes no more than 10 wt % of the first metal oxide (alternatively no more than 8 wt % of the first metal oxide, or no more than 6 wt % of the first metal oxide) and no more than 5 wt % of the second metal oxide (alternatively no more than 4 wt % of the second metal oxide, or no more than 3 wt % of the second metal oxide).

P28. The method of any one of paragraphs P9-P27 wherein the aromatization catalyst includes phosphorous.

P29. The method of paragraph P28 wherein the aromatization catalyst includes at least 0.1 wt % of phosphorous (alternatively at least 0.2 wt % of phosphorous, or at least 0.3 wt % of phosphorous).

P30. The method of any one of paragraphs P28-P29 wherein the aromatization catalyst includes 0.1-5 wt % of phosphorous (alternatively 0.2-4 wt % of phosphorous, or 0.3-3 wt % of phosphorous).

P31. The method of any one of paragraphs P28-P30 wherein the aromatization catalyst includes no more than 5 wt % of phosphorous (alternatively no more than 4 wt % of phosphorous, or no more than 3 wt % of phosphorous).

P32. The method of any one of paragraphs P9-P31 wherein the aromatization catalyst includes a binder.

P33. The method of paragraph P32 wherein the binder includes at least one of alumina or silica.

P34. The method of any one of paragraphs P1-P33 wherein at least 30 wt % of the C1-C4 hydrocarbons in the feed are converted to C5 or higher hydrocarbons in the first effluent (alternatively at least 40 wt % of the C1-C4 hydrocarbons in the feed are converted to C5 or higher hydrocarbons in the first effluent).

P35. The method of paragraph P34 wherein the C5 or higher hydrocarbons are aromatic C5 or higher hydrocarbons.

P36. The method of any one of paragraphs P1-P35 wherein at least 60 wt % of C4 hydrocarbons in the feed are converted to C5 or higher hydrocarbons in the first effluent (alternatively at least 70 wt % of the C4 hydrocarbons in the feed are converted to C5 or higher hydrocarbons in the first effluent or at least 80 wt % of the C4 hydrocarbons in the feed are converted to C5 or higher hydrocarbons in the first effluent).

P37. The method of paragraph P36 wherein the C5 or higher hydrocarbons are aromatic C5 or higher hydrocarbons.

P38. The method of any one of paragraphs P1-P37 wherein the first liquid product includes at least 60 wt % C6-C10 hydrocarbons (alternatively at least 70 wt % C6-C10 hydrocarbons, at least 80 wt % C6-C10 hydrocarbons, or at least 90 wt % C6-C10 hydrocarbons).

P39. The method of any one of paragraphs P1-P38 wherein the first liquid product includes 50-100 wt % C6-C10 hydrocarbons.

P40. The method of any one of paragraphs P1-P39 wherein the first liquid product includes at least 30 wt % of BTXE (alternatively at least 40 wt % of BTXE, at least 50 wt % of BTXE, or at least 60 wt % of BTXE).

P41. The method of any one of paragraphs P1-P40 wherein the hydroalkylation catalyst includes a zeolite material and an active metal.

P42. The method of paragraph P41 wherein the zeolite material has a molar ratio of $SiO_2/Al_2O_3$ of 10-200 (alternatively a molar ratio of $SiO_2/Al_2O_3$ of 10-100).

P43. The method of any one of paragraphs P41-P42 wherein the zeolite material has a molar ratio of $SiO_2/Al_2O_3$ of at least 10 (alternatively a molar ratio of $SiO_2/Al_2O_3$ of at least 20).

P44. The method of any one of paragraphs P41-P43 wherein the zeolite material has a molar ratio of $SiO_2/Al_2O_3$ of no more than 200 (alternatively a molar ratio of $SiO_2/Al_2O_3$ of no more than 100).

P45. The method of any one of paragraphs P41-P44 wherein the zeolite material includes an organosilicon microporous zeolite.

P46. The method of any one of paragraphs P41-P45 wherein the hydroalkylation catalyst includes 40-90 wt % of the zeolite material (alternatively the hydroalkylation catalyst includes 50-80 wt % of the zeolite material).

P47. The method of any one of paragraphs P41-P46 wherein the hydroalkylation catalyst includes at least 0.05 wt % of the active metal (alternatively at least 0.1 wt % of the active metal, or at least 0.5 wt % of the active metal).

P48. The method of any one of paragraphs P41-P47 wherein the hydroalkylation catalyst includes 0.05-5 wt % of the active metal (alternatively 0.1-4 wt % of the active metal, or 0.5-3 wt % of the active metal).

P49. The method of any one of paragraphs P41-P48 wherein the hydroalkylation catalyst includes no more than 5 wt % of the active metal (alternatively no more than 4 wt % of the active metal, or no more than 3 wt % of the active metal).

P50. The method of any one of paragraphs P41-P49 wherein the active metal includes a noble metal, nickel, and/or cobalt.

P51. The method of any one of paragraphs P41-P50 wherein the active metal includes ruthenium and/or palladium.

P52. The method of any one of paragraphs P41-P51 wherein the hydroalkylation catalyst includes a binder.

P53. The method of paragraph P52 wherein the hydroalkylation catalyst includes 10-60 wt % of the binder (alternatively 20-50 wt % of the binder).

P54. The method of any one of paragraphs P52-P53 wherein the binder includes at least one of aluminum oxide, titanium oxide, zinc oxide, or zirconium oxide.

P55. The method of any one of paragraphs P41-P54 wherein the hydroalkylation catalyst includes a transition metal.

P56. The method of paragraph P55 wherein the hydroalkylation catalyst includes 0.05-10 wt % of the transition metal (alternatively 0.1-8 wt % of the transition metal or 0.5-6 wt % of the transition metal).

P57. The method of any one of paragraphs P55-P56 wherein the transition metal includes at least one of vanadium, chromium, manganese, iron, cobalt, nickel, copper, or zinc.

P58. The method of any one of paragraphs P41-P57 wherein the hydroalkylation catalyst includes a metal oxide.

P59. The method of paragraph P58 wherein the hydroalkylation catalyst includes 1-20 wt % of the metal oxide (alternatively 2-17 wt % of the metal oxide or 3-12 wt % of the metal oxide).

P60. The method of any one of paragraphs P58-P59 wherein the metal oxide includes a rare earth metal oxide or zinc oxide.

P61. The method of any one of paragraphs P1-P60 wherein at least 30 wt % of BTXE in the first liquid product is converted to the diesel range hydrocarbons (alternatively at least 35 wt % of BTXE in the first liquid product is converted to the diesel range hydrocarbons).

P62. The method of any one of paragraphs P1-P61 wherein the diesel product has a cetane number of at least 40.

P63. The method of any one of paragraphs P1-P62 wherein the diesel product is diesel fuel.

P64. A method comprising any combination of one or more of the following: reacting a feed rich in one or more light alkanes with an aromatization catalyst to convert the one or more light alkanes to aromatic hydrocarbons and produce a first effluent including the aromatic hydrocarbons; separating the first effluent into a gas product that is primarily hydrogen and C1-C4 hydrocarbons and a first liquid product that is primarily gasoline range hydrocarbons and includes the aromatic hydrocarbons; reacting the first liquid product with a hydroalkylation catalyst to convert the aromatic hydrocarbons into diesel range hydrocarbons and produce a second effluent; separating the second effluent into a second liquid product that is primarily gasoline range hydrocarbons and a third liquid product that is primarily diesel range hydrocarbons; and hydrogenating the third liquid product to produce a diesel product having a cetane number of at least 35.

P65. The method of paragraph P64 wherein the feed includes at least 50 wt % C1-C5 hydrocarbons.

P66. The method of any one of paragraphs P64-P65 wherein the feed includes at least 50 wt % C3-C5 hydrocarbons.

P67. The method of any one of paragraphs P64-P66 wherein the aromatization catalyst includes a zeolite material and a metal oxide.

P68. The method of paragraph P67 wherein the aromatization catalyst includes 0.1-10 wt % of the metal oxide.

P69. The method of any one of paragraphs P67-P68 wherein the metal oxide includes at least one of zinc oxide or gallium oxide.

P70. The method of any one of paragraphs P67-P69 wherein the metal oxide includes a rare earth metal oxide.

P71. The method of any one of paragraphs P67-P70 wherein the aromatization catalyst includes phosphorous.

P72. The method of any one of paragraphs P64-P71 wherein at least 30 wt % of the C1-C4 hydrocarbons in the feed are converted to C5 or higher hydrocarbons in the first effluent.

P73. The method of any one of paragraphs P64-P72 wherein the first liquid product includes at least 60 wt % C6-C10 hydrocarbons.

P74. The method of any one of paragraphs P64-P73 wherein the hydroalkylation catalyst includes a zeolite material and an active metal.

P75. The method of paragraph P74 wherein the active metal includes ruthenium and/or palladium.

P76. The method of any one of paragraphs P64-P75 wherein at least 30 wt % of BTXE in the first liquid product is converted to the diesel range hydrocarbons.

P77. The method of any one of paragraphs P64-P76 wherein the diesel product has a cetane number of at least 40.

P78. A method comprising any combination of one or more of the following: reacting a feed rich in one or more light alkanes with an aromatization catalyst to convert the one or more light alkanes to aromatic hydrocarbons and produce a first effluent including the aromatic hydrocarbons, the feed including at least 50 wt % C1-C5 hydrocarbons; separating the first effluent into a gas product that is primarily hydrogen and C1-C4 hydrocarbons and a first liquid product that is primarily gasoline range hydrocarbons and includes the aromatic hydrocarbons; reacting the first liquid product with a hydroalkylation catalyst to convert the aromatic hydrocarbons into diesel range hydrocarbons and produce a second effluent; separating the second effluent into a second liquid product that is primarily gasoline range hydrocarbons and a third liquid product that is primarily diesel range hydrocarbons; and hydrogenating the third liquid product to produce a diesel product.

P79. The method of paragraph P78 wherein the feed includes at least 50 wt % C3-C5 hydrocarbons.

P80. The method of any one of paragraphs P78-P79 wherein the aromatization catalyst comprises: 40-90 wt % of a zeolite material; 0.1-10 wt % of a first metal oxide, the first metal oxide including at least one of zinc oxide or gallium oxide; and 0.2-4 wt % of a rare earth metal oxide.

P81. The method of paragraph P80 wherein the aromatization catalyst includes phosphorous.

P82. The method of any one of paragraphs P78-P81 wherein at least 30 wt % of the C1-C4 hydrocarbons in the feed are converted to C5 or higher hydrocarbons in the first effluent.

P83. The method of any one of paragraphs P78-P82 wherein at least 30 wt % of BTXE in the first liquid product is converted to the diesel range hydrocarbons.

General Terminology and Interpretative Conventions

Any methods described in the claims or specification should not be interpreted to require the steps to be performed in a specific order unless expressly stated otherwise. Also, the methods should be interpreted to provide support to perform the recited steps in any order unless expressly stated otherwise.

Certain features described in the context of separate embodiments can also be implemented in combination in a single embodiment. Conversely, various features that are described in the context of a single embodiment can also be implemented in multiple embodiments separately or in any suitable subcombination. Moreover, although features may be described above in certain combinations and even initially claimed as such, one or more features from a claimed combination can be excised from the combination, and the claimed combination may be directed to a subcombination or variation of a subcombination.

The example configurations described in this document do not represent all the examples that may be implemented or that are within the scope of the claims. The term "example" shall be interpreted to mean "serving as an example, instance, or illustration," and not "preferred" or "advantageous over other examples."

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition may be based on the recited condition and one or more unrecited conditions.

The terms have, having, contain, containing, include, including, and characterized by should be interpreted to be synonymous with the terms comprise and comprising—i.e., the terms are inclusive or open-ended and do not exclude additional unrecited subject matter. The use of these terms should also be understood as disclosing and providing support for narrower alternative embodiments where these terms are replaced by "consisting of," "consisting of the recited subject matter plus impurities and/or trace amounts of other materials," or "consisting essentially of."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims should be interpreted as invoking 35 U.S.C. 112(f) unless the words "means for" or "step for" are explicitly recited in the claim.

Unless explicitly stated otherwise or otherwise apparent from context, terms such as "processing," "computing," "calculating," "determining," "displaying," or the like, refer to the action and processes of an electronic computing device including a processor and memory.

The subject matter recited in the claims is not coextensive with and should not be interpreted to be coextensive with any embodiment, feature, or combination of features described or illustrated in this document. This is true even if only a single embodiment of the feature or combination of features is illustrated and described.

Composition Related Terminology and Interpretative Conventions

Values expressed as a percentage, parts of, or a ratio are by weight unless expressly stated otherwise.

The description of a group or class of materials as suitable or preferred for a given purpose shall be understood as disclosing that a single member of the group or class or a mixture of any two or more members of the group or class are equally suitable or preferred.

The description of constituents in chemical terms refers to the constituents: (a) at the time of addition to any combination specified in the description and/or (b) generated in situ by chemical reactions with other constituents. The description of the constituents does not preclude other chemical interactions among the constituents of a mixture once mixed unless expressly stated otherwise.

The description of materials in ionic form additionally implies the presence of sufficient counter ions to produce electrical neutrality for the composition.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

PRIORITY PATENT DOCUMENTS
INCORPORATED BY REFERENCE

U.S. Prov. App. No. 63/489,116, titled "Process to Convert Light Alkanes to Diesel," filed on 8 Mar. 2023.

Additional Documents Incorporated by Reference

ASTM D613-18ae1 titled "Standard Test Method for Cetane Number of Diesel Fuel Oil."
ASTM D2887-19ae2 titled "Standard Test Method for Boiling Range Distribution of Petroleum Fractions by Gas Chromatography."

What is claimed is:

1. A method comprising:
reacting a feed including one or more C1-C5 alkanes with an aromatization catalyst to convert the one or more C1-C5 alkanes to aromatic hydrocarbons and produce a first effluent including the aromatic hydrocarbons;
separating the first effluent into a gas product that is at least 50 wt % hydrogen and C1-C4 hydrocarbons and a first liquid product that is at least 50 wt % gasoline range hydrocarbons and includes the aromatic hydrocarbons;
reacting the first liquid product with a hydroalkylation catalyst to convert the aromatic hydrocarbons into diesel range hydrocarbons and produce a second effluent;
separating the second effluent into a second liquid product that is at least 50 wt % gasoline range hydrocarbons and a third liquid product that is at least 50 wt % diesel range hydrocarbons; and
hydrogenating the third liquid product to produce a diesel product having a cetane number of at least 35.

2. The method of claim 1 wherein the feed includes at least 50 wt % C1-C5 hydrocarbons.

3. The method of claim 1 wherein the feed includes at least 50 wt % C3-C5 hydrocarbons.

4. The method of claim 1 wherein the aromatization catalyst includes a zeolite material and a metal oxide.

5. The method of claim 4 wherein the aromatization catalyst includes 0.1-10 wt % of the metal oxide.

6. The method of claim 4 wherein the metal oxide includes at least one of zinc oxide or gallium oxide.

7. The method of claim 4 wherein the metal oxide includes a rare earth metal oxide.

8. The method of claim 4 wherein the aromatization catalyst includes phosphorus.

9. The method of claim 1 wherein at least 30 wt % of the C1-C4 hydrocarbons in the feed are converted to C5 or higher hydrocarbons in the first effluent.

10. The method of claim 1 wherein the first liquid product includes at least 60 wt % C6-C10 hydrocarbons.

11. The method of claim 1 wherein the hydroalkylation catalyst includes a zeolite material and an active metal.

12. The method of claim 11 wherein the active metal includes ruthenium and/or palladium.

13. The method of claim 1 wherein at least 30 wt % of BTXE in the first liquid product is converted to the diesel range hydrocarbons.

14. The method of claim 1 wherein the diesel product has a cetane number of at least 40.

15. A method comprising:
reacting a feed including one or more C1-C5 alkanes with an aromatization catalyst to convert the one or more C1-C5 alkanes to aromatic hydrocarbons and produce a first effluent including the aromatic hydrocarbons, the feed including at least 50 wt % C1-C5 hydrocarbons;
separating the first effluent into a gas product that is at least 50 wt % hydrogen and C1-C4 hydrocarbons and a first liquid product that is at least 50 wt % gasoline range hydrocarbons and includes the aromatic hydrocarbons;
reacting the first liquid product with a hydroalkylation catalyst to convert the aromatic hydrocarbons into diesel range hydrocarbons and produce a second effluent;
separating the second effluent into a second liquid product that is at least 50 wt % gasoline range hydrocarbons and a third liquid product that is at least 50 wt % diesel range hydrocarbons; and
hydrogenating the third liquid product to produce a diesel product.

16. The method of claim 15 wherein the feed includes at least 50 wt % C3-C5 hydrocarbons.

17. The method of claim 15 wherein the aromatization catalyst comprises:
40-90 wt % of a zeolite material;
0.1-10 wt % of a first metal oxide, the first metal oxide including at least one of zinc oxide or gallium oxide; and
0.2-4 wt % of a rare earth metal oxide.

18. The method of claim 17 wherein the aromatization catalyst includes phosphorous.

19. The method of claim 15 wherein at least 30 wt % of the C1-C4 hydrocarbons in the feed are converted to C5 or higher hydrocarbons in the first effluent.

20. The method of claim 15 wherein at least 30 wt % of BTXE in the first liquid product is converted to the diesel range hydrocarbons.

* * * * *